US012164685B2

(12) United States Patent
Sztuk et al.

(10) Patent No.: US 12,164,685 B2
(45) Date of Patent: Dec. 10, 2024

(54) GAZE-BASED USER INTERFACE WITH ASSISTANT FEATURES FOR SMART GLASSES IN IMMERSIVE REALITY APPLICATIONS

(71) Applicant: Meta Platforms Technologies, LLC, Menlo Park, CA (US)

(72) Inventors: Sebastian Sztuk, Virum (DK); Salvael Ortega Estrada, Cedar Park, TX (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/471,186

(22) Filed: Sep. 20, 2023

(65) Prior Publication Data

US 2024/0012475 A1  Jan. 11, 2024

Related U.S. Application Data

(63) Continuation of application No. 17/950,959, filed on Sep. 22, 2022, now Pat. No. 11,789,530.

(60) Provisional application No. 63/318,651, filed on Mar. 10, 2022, provisional application No. 63/280,515, filed on Nov. 17, 2021.

(51) Int. Cl.
*G06F 3/01* (2006.01)
*G06F 3/04817* (2022.01)
*G06F 3/0485* (2022.01)
*G06F 3/16* (2006.01)
*G06F 9/451* (2018.01)
*H04M 1/72469* (2021.01)

(52) U.S. Cl.
CPC .............. *G06F 3/013* (2013.01); *G06F 3/017* (2013.01); *G06F 3/04817* (2013.01); *G06F 3/0485* (2013.01); *G06F 3/167* (2013.01); *G06F 9/453* (2018.02); *H04M 1/72469* (2021.01)

(58) Field of Classification Search
None
See application file for complete search history.

(56) References Cited

U.S. PATENT DOCUMENTS

| | | | |
|---|---|---|---|
| 10,620,700 | B2 | 4/2020 | Publicover et al. |
| 2016/0066295 | A1 | 3/2016 | Han et al. |
| 2016/0098093 | A1 | 4/2016 | Cheon et al. |
| 2020/0322595 | A1 | 10/2020 | Abe et al. |
| 2021/0097776 | A1 | 4/2021 | Faulkner et al. |
| 2022/0197394 | A1 | 6/2022 | Ha et al. |

OTHER PUBLICATIONS

EPO—International Search Report and Written Opinion for International Application No. PCT/US2022/049947, mailed May 24, 2023, 15 pages.
EPO—Invitation to Pay Additional Fees for International Application No. PCT/US2022/049947, mailed Mar. 29, 2023, 9 pages.

*Primary Examiner* — Nicholas J Lee
(74) *Attorney, Agent, or Firm* — McDermott Will & Emery LLP

(57) ABSTRACT

A method for managing a user interface in a smart glass is provided. The method includes identifying an eye gesture of the user of the smart glass, based on an eye-tracking signal indicative of a pupil location of the user, assessing a user intention for an application displayed in a user interface in the headset based on the eye gesture, and activating the application based on the user intention. A smart glass for use with the above method is also provided.

20 Claims, 7 Drawing Sheets

GAZE-BASED USER INTERFACE WITH ASSISTANT FEATURES FOR SMART GLASSES IN IMMERSIVE REALITY APPLICATIONS

CROSS-REFERENCE TO RELATED APPLICATIONS

This present application claims the benefit of priority under 35 U.S.C. 120 as a continuation of U.S. patent application Ser. No. 17/950,959, filed Sep. 22, 2022, now allowed, which claims the benefit of U.S. Prov. Appl. No. 63/318,651, entitled GAZE-BASED USER INTERFACE WITH ASSISTANT FEATURES FOR SMART GLASSES IN IMMERSIVE REALITY APPLICATIONS, to Sebastian SZTUK, et-al., filed on Mar. 10, 2022, and to U.S. Prov. Appl. No. 63/280,515, entitled GAZE-BASED USER INTERFACE WITH ASSISTANT FEATURES, to Sebastian SZTUK, et-al., filed on Nov. 17, 2021, the contents of which applications are hereby incorporated by reference, for all purposes.

BACKGROUND

Field

The present disclosure is directed to user interfaces for wearable devices for immersive reality environments. More specifically, embodiments as disclosed herein are directed to user interfaces based on gaze direction in smart glasses in augmented reality applications.

Related Art

In the field of wearable devices, the user interface plays a critical role for wearability, user comfort, and device effectiveness. User interfaces for headset wearables, including smart glasses, induce users to perform unnatural head motions (e.g., nodding or shaking), which seem eccentric to the onlooker (out of place or out of time). Some approaches for user interfaces may include joysticks and other elements (real or virtual) that require action of hands, fingers, and other body parts from the user. These exertions may be undesirable for smart glasses, where users may be involved in a different activity and find it intrusive or plainly impossible to perform input actions at any given time.

SUMMARY

In a first embodiment, a computer-implemented method is provided that includes identifying an eye gesture of the user of a smart glass, based on an eye-tracking signal indicative of a pupil location of the user, assessing a user intention for an application displayed in a user interface in the smart glass based on the eye gesture, and activating the application based on the user intention.

In a second embodiment, a device is provided that includes at least one of a left eyepiece or a right eyepiece mounted on a frame, an eye-tracking device configured to identify a pupil location for a user, and a processor configured to receive a signal from the eye-tracking device, the signal indicative of a user intention with the application interface, and to activate the application interface based on the user intention.

These and other embodiments will become clear in light of the following disclosure.

Figure 1:
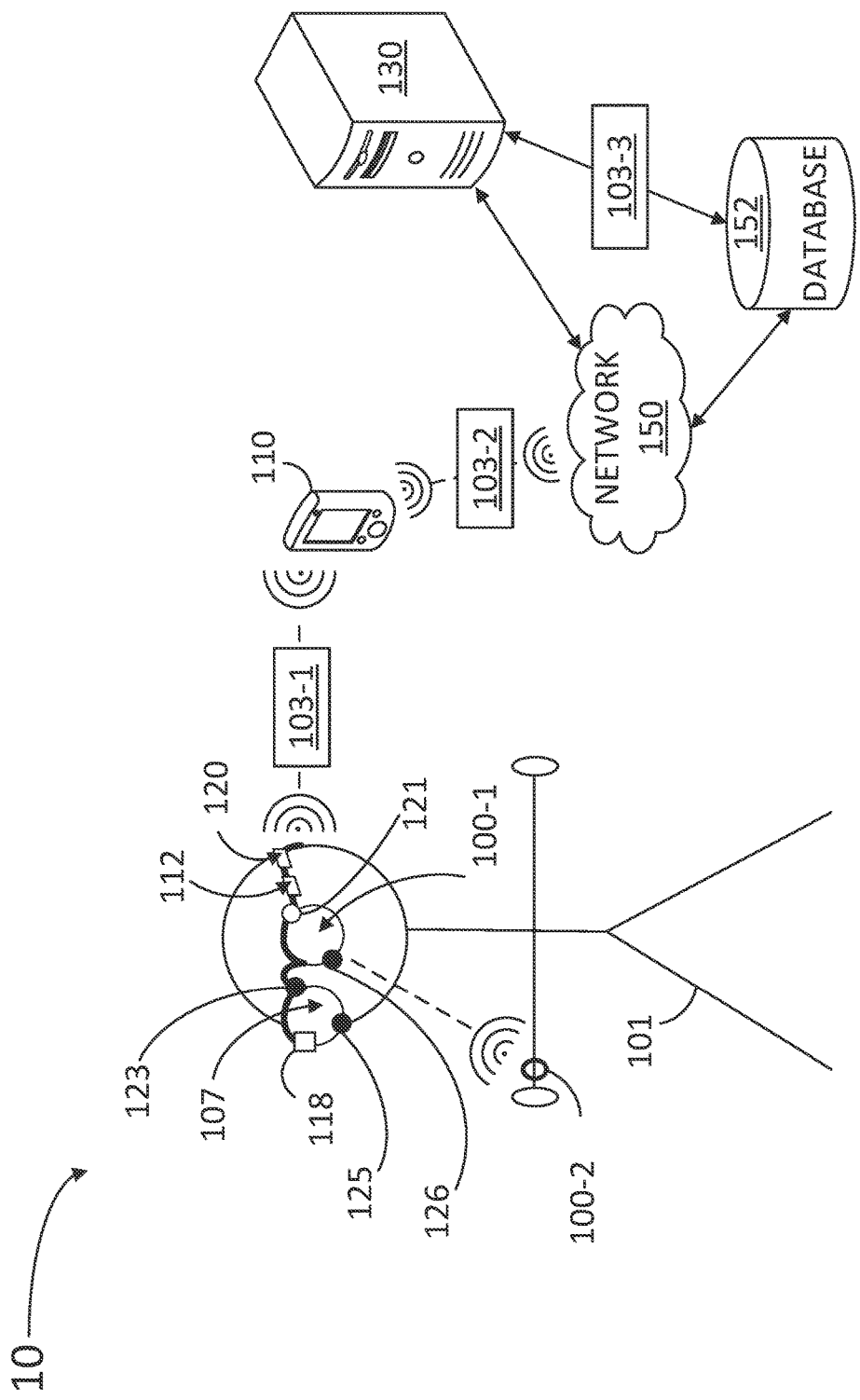
FIG. 1 illustrates an architecture including one or more wearable devices coupled to one another, to a mobile device, a remote server and to a database, according to some embodiments.

In the figures, elements and steps associated with the same or similar reference label are associated with the same or similar attributes, unless explicitly stated otherwise.

DETAILED DESCRIPTION

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure.

Wearable headsets, especially smart glasses that users wear while performing other activities (e.g., driving, outdoor activities, and the like), should desirably require user's hands, fingers, and body parts other than the head as little as possible, if at all.

To resolve the above challenge, smart glasses as disclosed herein include eye and gaze user interfaces with an inward camera facing the user to identify pupil location, gaze direction and vergence point for a stereo system. In some embodiments, to capture user pupil location and gaze direction, the smart glasses may include a micro-electromechanical system (MEMS) based hot mirror, a holographic optical element (HOE) combiner, and the like. In some embodiments, eye-tracking software and hardware may include infrared cameras and image recognition algorithms (e.g., machine learning, artificial intelligence, neural networks, and the like) to find the user's pupil. In some embodiments, an eye-tracking device may include a range finder using emitters and detectors of pulsed radiation (e.g., electromagnetic radiation, such as radio-frequency, RF, or infrared pulses, or acoustic radiation such as ultrasound pulses). More generally, eye-tracking hardware and software may be configured to identify and assess eye movement, duration and speed of the eye movement, and gaze direction, duration, and fixation of the user. Accordingly, some embodiments may activate the display upon pre-selected pupil movements, such as moving the pupils such that the gaze would no longer be in the active area of the display. In some embodiments, the pupils may move so that the inward camera can no longer detect a pupil. To accept incoming calls, the system may identify a user who may dwell their gaze in the area of a pickup call icon (e.g., colored green) for a pre-selected period of time. Likewise, to hang up or dismiss the call, the system may identify a user who may dwell their gaze in the area of a hang up call icon (e.g., colored red), for a pre-determined period of time.

Additionally, in some embodiments, the inward camera captures, and the system identifies, other eye gestures (e.g., pre-selected pupil motions) to produce pinch, scrolling, panning, and text entry on items in the display.

While gaze is a good signal for acting like a cursor for text applications, for selecting objects or icons a gaze signal may preferably be combined with other user actions captured by ancillary wearable devices and sensors, and even voice commands captured with a microphone. In some embodiments, smart glasses are configured for activating a virtual assistant by detecting a user gaze on an assistant icon on or off the screen (e.g., hot corners) while speaking out a command calling for the virtual assistant. These and other features may also be combined with an electromagnetic signal received from a wrist wearable, indicative of a pinching or hand-selection. In some embodiments the smart glasses may include electroencephalogram (EEG) sensors on the user's head or may communicate with EEG sensors on a headset to make the activations. In some embodiments, the smart glasses may be used interactively with a second device (e.g., a laptop), wherein an inward camera in the smart glasses may identify an area of a text that is being displayed on the laptop (and viewed by the user through the smart glasses), and the laptop cursor would move accordingly.

FIG. 1 illustrates an architecture 10 including one or more wearable devices 100-1 and 100-2 (hereinafter, collectively referred to as "wearable devices 100") coupled to one another, to a mobile device 110, a remote server 130 and to a database 152, through a network 150, according to some embodiments. Wearable devices 100 may include a smart glass 100-1 or headset configured for AR/VR applications and a wristband 100-2, and mobile device 110 may be a smart phone, all of which may communicate with one another via wireless communications and exchange a first dataset (e.g., dataset 103-1). Dataset 103-1 may include a recorded video, audio, or some other file or streaming media. A user 101 of wearable devices 100 is also the owner or is associated with mobile device 110. In some embodiments, smart glass 100-1 may directly communicate with remote server 130, database 152, or any other client device 110 (e.g., a smart phone of a different user, and the like) via network 150. Mobile device 110 may be communicatively coupled with remote server 130 and database 152 via network 150, and transmit/share information, files, and the like with one another (e.g., dataset 103-2 and dataset 103-3). Datasets 103-1, 103-2, and 103-3 will be collectively referred to as "datasets 103."

In some embodiments, smart glass 100-1 or headset may include multiple sensors 125 such as inertial measurement units (IMUs), gyroscopes, microphones, and capacitive sensors configured as touch interfaces for the user. Other touch sensors 125 may include a pressure sensor, a thermometer, and the like. In some embodiments, smart glass 100-1 may also include a haptic actuator 126 to recreate a sense of touch to the user, for a VR/AR application. An outward camera 121 faces outside of smart glass 100-1, and an inward camera 123 collects an image of the face of user 101 including eyes and pupils. Outward camera 121 may collect images of the hands and other body parts, with which user 101 may make input gestures for AR/VR applications running in smart glass 100-1. Wristband 100-2 may include touch and stress sensors to detect movement of muscles and tendons in the wrist, as the user makes hand or finger gestures (e.g., typing on a keyboard, pointing to an object, rolling or scrolling through a webpage, or handling a graphic object). Wrist and hand movements detected with wristband 100-2 may thus be combined with a gaze signal from smart glass 100-1, to accurately assess user intentions in an application running in smart glass 100-1, in client device 110, or in remote server 130, and that is viewed by the user through smart glass 100-1.

In addition, wearable devices 100, or mobile device 110 may include a memory circuit 120 storing instructions, and a processor circuit 112 configured to execute the instructions to cause smart glass 100-1 to perform, at least partially, some of the steps in methods consistent with the present disclosure. In some embodiments, smart glass 100-1, mobile device 110, server 130, and/or database 152 may further include a communications module 118 enabling device 100-1 to wirelessly communicate with remote server 130 via network 150. Smart glass 100-1 may thus download a multimedia online content (e.g., datasets 103) from remote server 130, to perform at least partially some of the operations in methods as disclosed herein. In some embodiments, memory 120 may include instructions to cause processor 112 to receive and combine signals from the touch sensors in wristband 100-2 and in smart glass 100-1, and the inward/outward cameras 123/121 to assess or identify a user input and perform a desired action. For example, in some embodiments, the instructions in memory 120 may include eye-tracking software to identify a gaze direction of the user within display 107. In addition, instructions stored in memory 120 may include artificial intelligence and machine learning software configured to accurately interpret multiple input signals as specific instructions and commands from user 101. The machine learning and artificial intelligence software may also filter out interference and other unrelated signals provided by sensors 125, cameras 121/123, and microphones in smart glass 100-1 and wristband 100-2.

Figure 2:
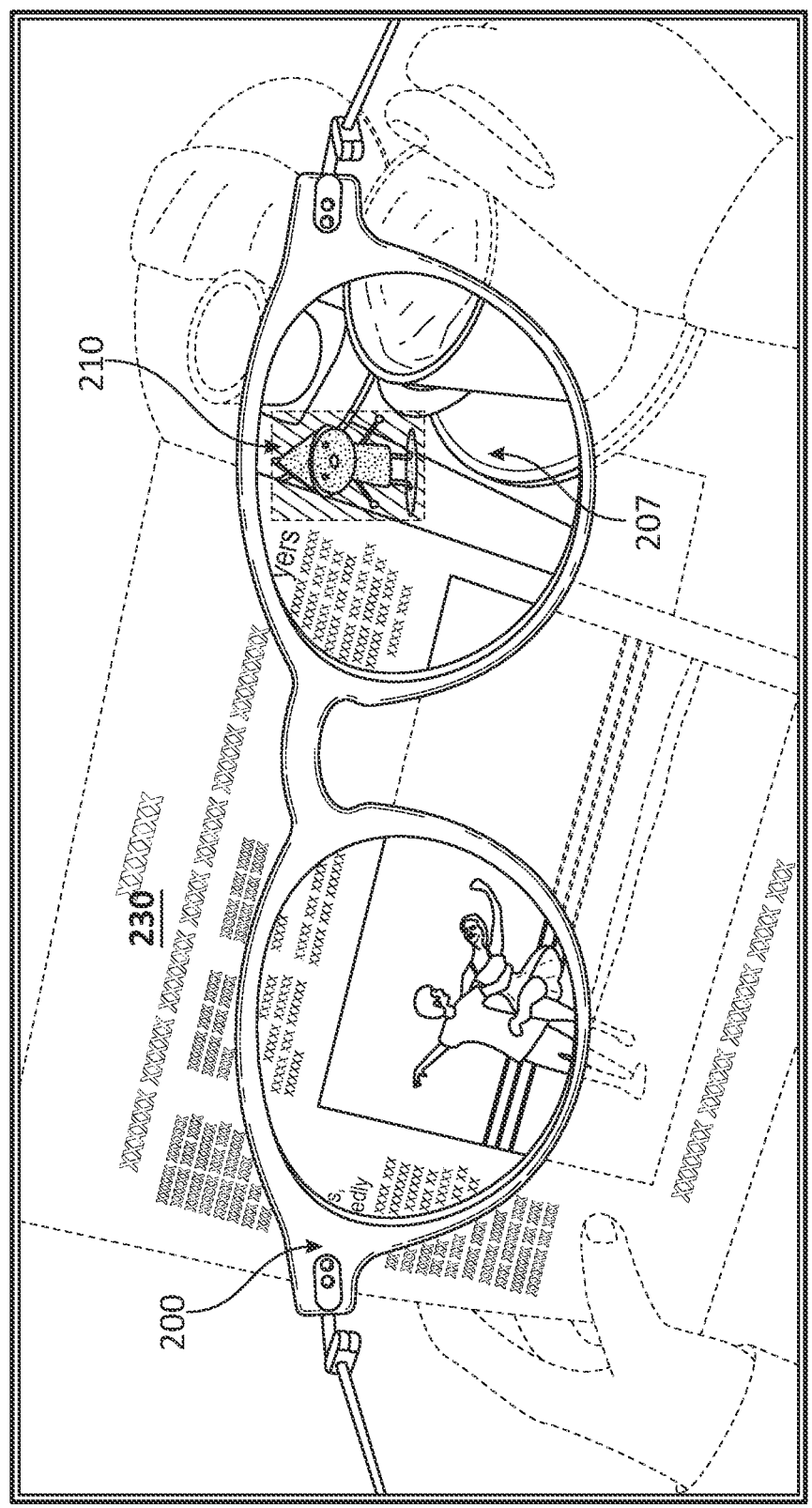
FIG. 2 illustrates a smart glass including an elf assistant in a display in a gaze-based user interface, according to some embodiments.

FIG. 2 illustrates a smart glass 200 including an elf assistant 210 in a display 207 in a gaze-based user interface, according to some embodiments. Assistant 210 may pop up on display 207 based on a content 230 being read by the user, or upon an explicit request by the user (e.g., via a voice command, a gesture, or a gaze directed to a corner of display 207).

Figure 3:
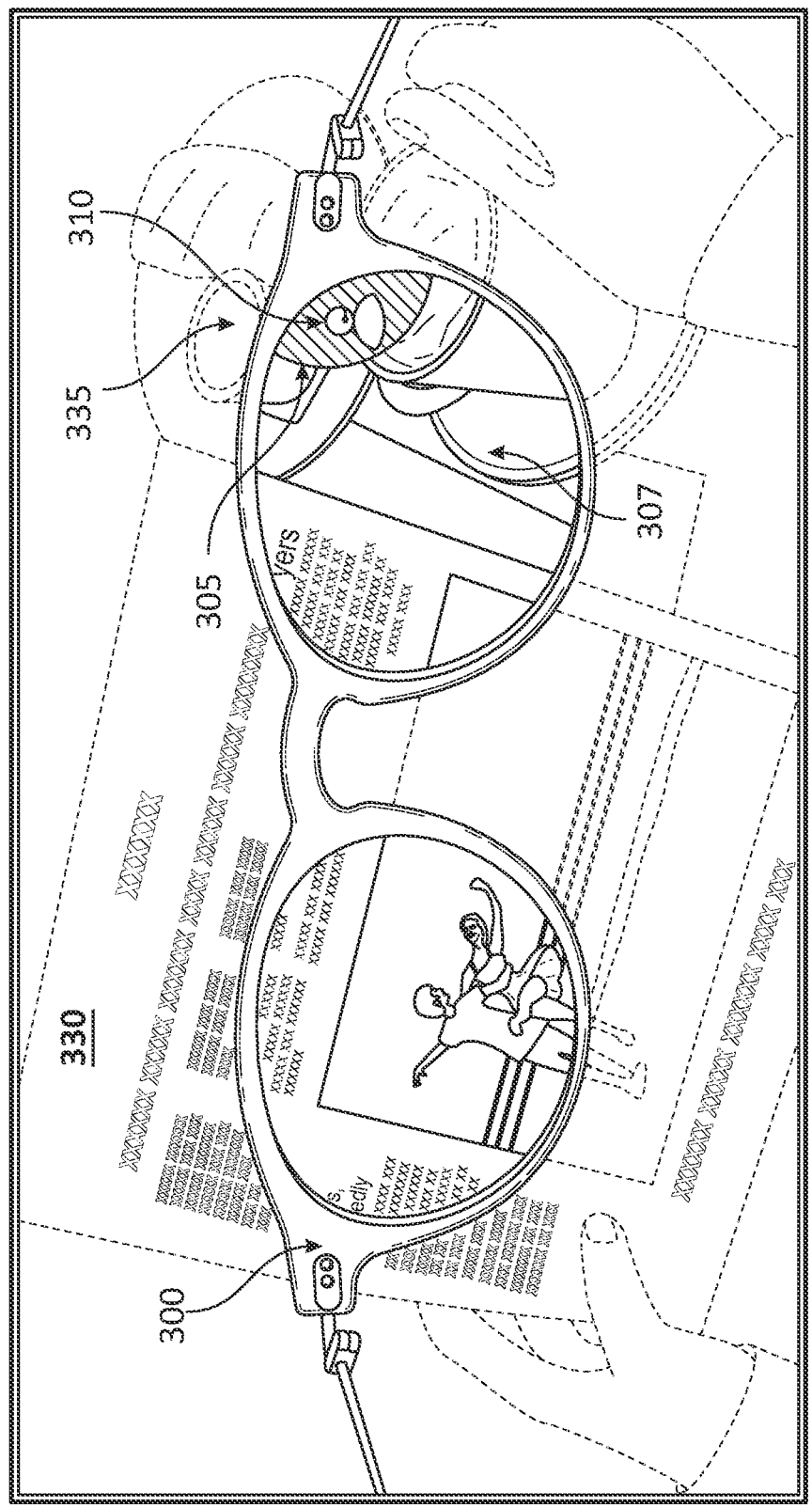
FIG. 3 illustrates a smart glass including a hot corner with an assistant in a gaze-based user interface, according to some embodiments.

FIG. 3 illustrates a smart glass 300 including a hot corner 305 with an assistant 310 in a gaze-based user interface, according to some embodiments. Assistant 310 may pop up on display 307 based on a content 330 being read by the user, or upon an explicit request by the user (e.g., via a voice command, a gesture, or a gaze directed towards hot corner 305). In some embodiments, assistant 310 may pop up automatically by a camera in smart glass 300 identifying certain objects 335 (e.g., pastries, coffee, wherein the assistant recommends other items to purchase, places to buy, or even advises the user as to the caloric content of each of the items in the field of view) in the user's environment.

Figure 4:
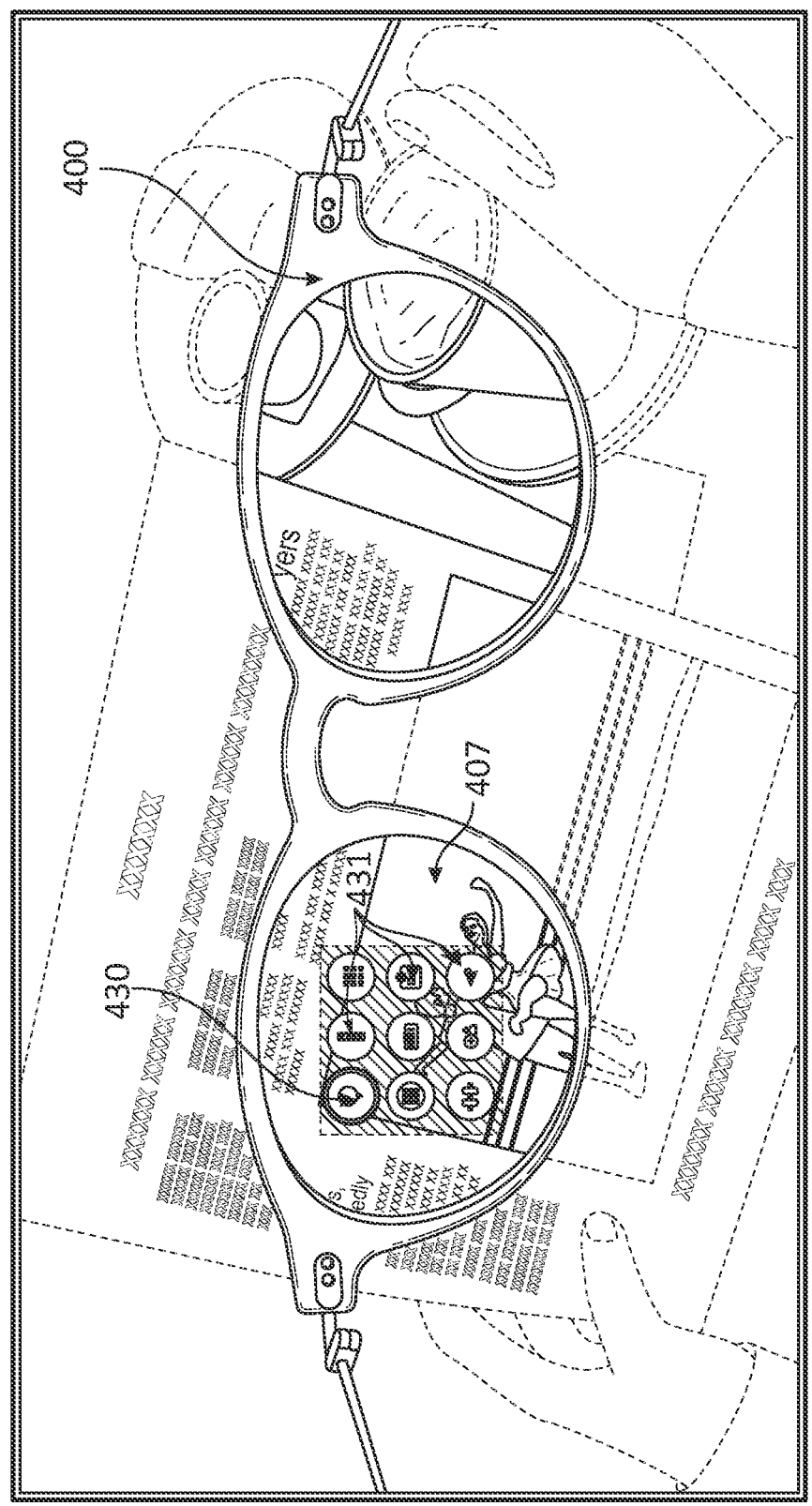
FIG. 4 illustrates a smart glass including a menu with multiple icons in a display, wherein the user selects an icon by a gaze pointing, according to some embodiments.

FIG. 4 illustrates a smart glass 400 including a menu 430 with multiple icons 431 in a display 407, wherein the user selects an icon 431 by a gaze pointing, according to some embodiments. Each of icons 431 may be associated with a different application that may be paired between smart glass 400 and a mobile device with the user (e.g., mobile device 110).

Figure 5:
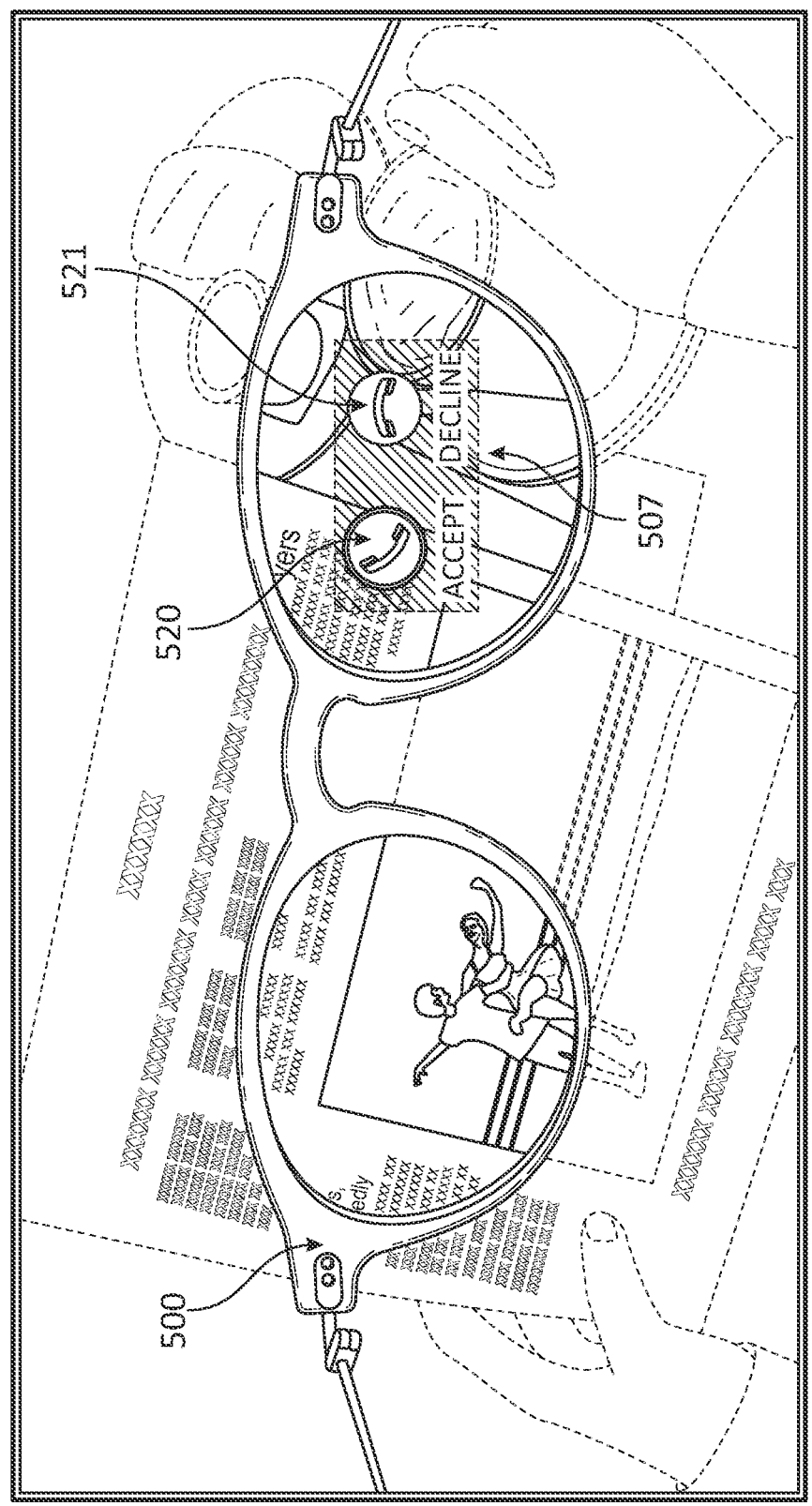
FIG. 5 illustrates a smart glass including a call pickup and a call hung up icon in a display, wherein the user selects one of the icons by a gaze pointing, according to some embodiments.

FIG. 5 illustrates a smart glass 500 including a call pickup icon 520 and a call hung up icon 521 in a display 507, wherein the user selects one of the icons (520/521) by a gaze pointing, according to some embodiments.

Figure 6:
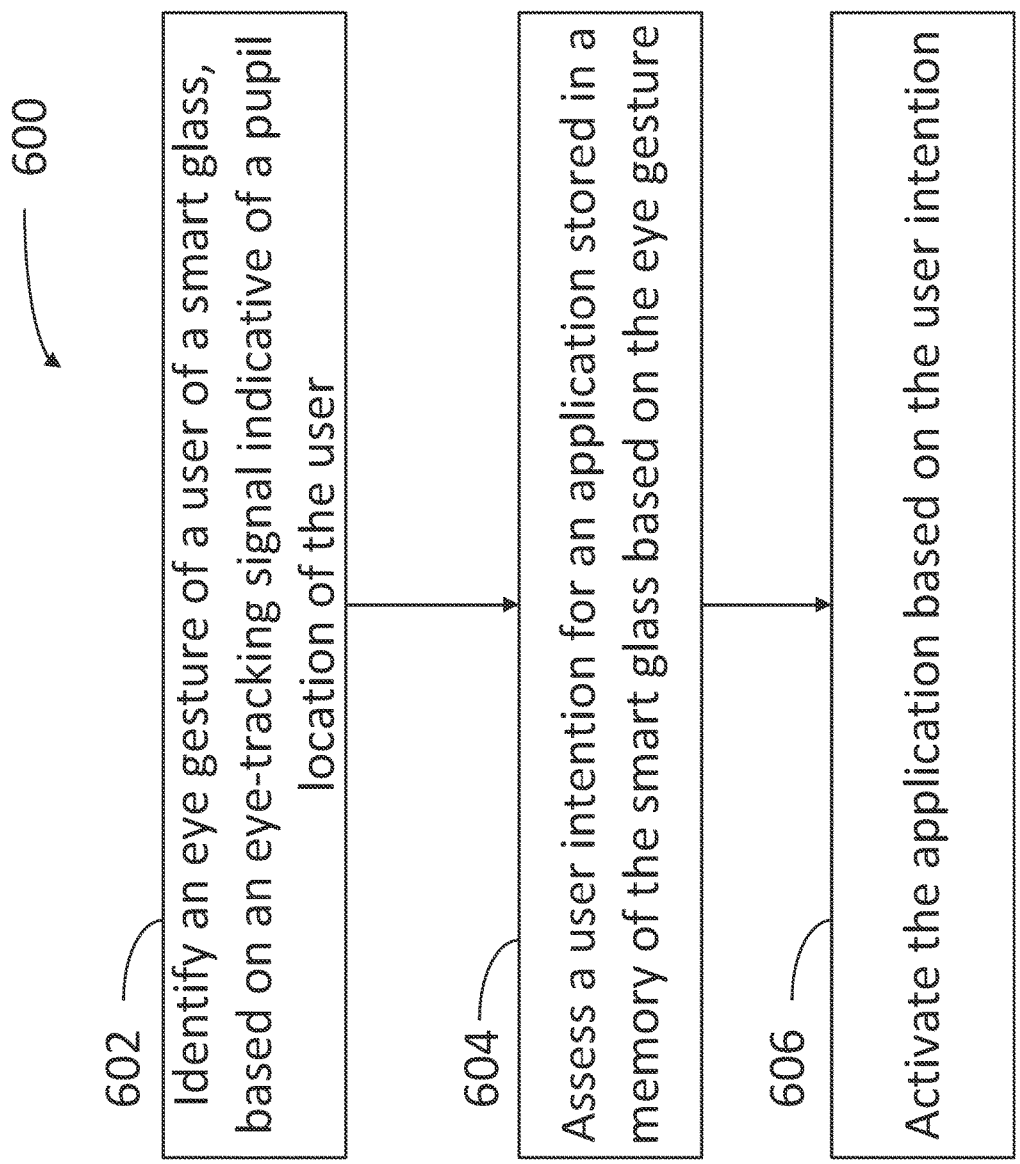
FIG. 6 is a flowchart illustrating steps in a method for activating an immersive reality application in a smart glass, according to some embodiments.

FIG. 6 is a flow chart illustrating steps in a method 600 for activating an immersive reality application in a smart glass, according to some embodiments. In some embodiments, at least one or more of the steps in method 600 may be performed by a processor executing instructions stored in a memory in either one of a smart glass or other wearable device on a user's body part (e.g., head, arm, wrist, leg, ankle, finger, toe, knee, shoulder, chest, back, and the like). In some embodiments, at least one or more of the steps in method 600 may be performed by a processor executing instructions stored in a memory, wherein either the processor or the memory, or both, are part of a mobile device for the user, a remote server or a database, communicatively coupled with each other via a network. Moreover, the mobile device, the smart glass, and the wearable devices may be communicatively coupled with each other via a wireless communication system and protocol (e.g., radio, Wi-Fi, Bluetooth, near-field communication—NFC—and the like). In some embodiments, a method consistent with the present disclosure may include one or more steps from method 600 performed in any order, simultaneously, quasi-simultaneously, or overlapping in time. Accordingly, in some embodiments, the smart glass may include a left eyepiece and a right eyepiece mounted on a frame, and a display in at least one of the left eyepiece or the right eyepiece, the display configured to provide an application interface for a user. The smart glass may also include an eye-tracking device configured to identify a pupil location for a user and a processor configured to receive a signal from the eye-tracking device, the signal indicative of a user intention with the application interface, and to activate the application interface based on the user intention.

Step 602 includes identifying an eye gesture of the user of a smart glass, based on an eye-tracking signal indicative of a pupil location of the user. In some embodiments, step 602 includes displaying, on at least one eyepiece of a smart glass, an application interface for a user of the smart glass, and step 602 includes highlighting an icon in the application interface, and activating the application based on the user intention further includes activating the icon in the application interface. In some embodiments, step 602 includes receiving a signal from a second wearable device on a wrist of the user and identifying a hand gesture of the user based on the signal from the second wearable device, wherein assessing a user intention for an application stored in the memory of the smart glass further includes reproducing the hand gesture on an application interface displayed on an eyepiece of the smart glass. For example, in some embodiments, the user may gaze at an icon/hot corner/AR assistant/AR object/ world object in a scene displayed by the smart glass, in response to which the user makes a gesture for activation, such as a pinch gesture (with the hand) to activate the assistant. Step 602 may include receiving the pinch gesture from a wrist-band and associating it with the icon/hot corner/AR assistant/AR object/world object displayed by the smart glass. In some embodiments, step 602 includes receiving a signal from a second wearable device on a wrist of the user, the signal indicative of one of a scrolling, pinching, panning, or flipping gesture from the user, and wherein activating the application based on the user intention includes scrolling, pinching, or flipping a graphic element of the application on a display in at least one of the eyepieces of the smart glass. In some embodiments, step 602 includes displaying, on at least one eyepiece of the smart glass, a virtual assistant, and activating the virtual assistant when the eye gesture includes a gaze direction into the virtual assistant.

In some embodiments, a smart glass system for immersive reality applications includes a gaze "plus" voice scheme where a voice command from the user is associated with an identified object of interest based on a gaze direction of the user. For example, when the user is gazing at a TV (identifiable by image recognition algorithms) and the user utters the words "volume up" (detected by a microphone in the smart glass or in the second wearable device), the smart glass system identifies that the volume of the TV needs to be raised accordingly. Likewise, when the user utters the word "ok," or speaks to one of multiple virtual assistants on the display of the smart glass (e.g., when the user is running multiple interactive applications simultaneously), the system is able to identify which of the multiple assistants the user is interacting with by determining a direction of the user's gaze.

Step 604 includes assessing a user intention for an application stored in a memory of the smart glass based on the eye gesture. In some embodiments, the application stored in the memory of the smart glass includes a telephone application, and step 604 includes displaying a pickup icon and a hang up icon on at least one eyepiece of the smart glass when the user receives a call from the telephone application. In some embodiments, step 604 includes highlighting one of the pickup icon or the hang up icon based on the eye gesture and assessing the user intention to pick up the call when the user maintains a gaze on the pickup icon for a time longer than a pre-selected threshold.

Step 606 includes activating the application based on the user intention.

Hardware Overview

Figure 7:
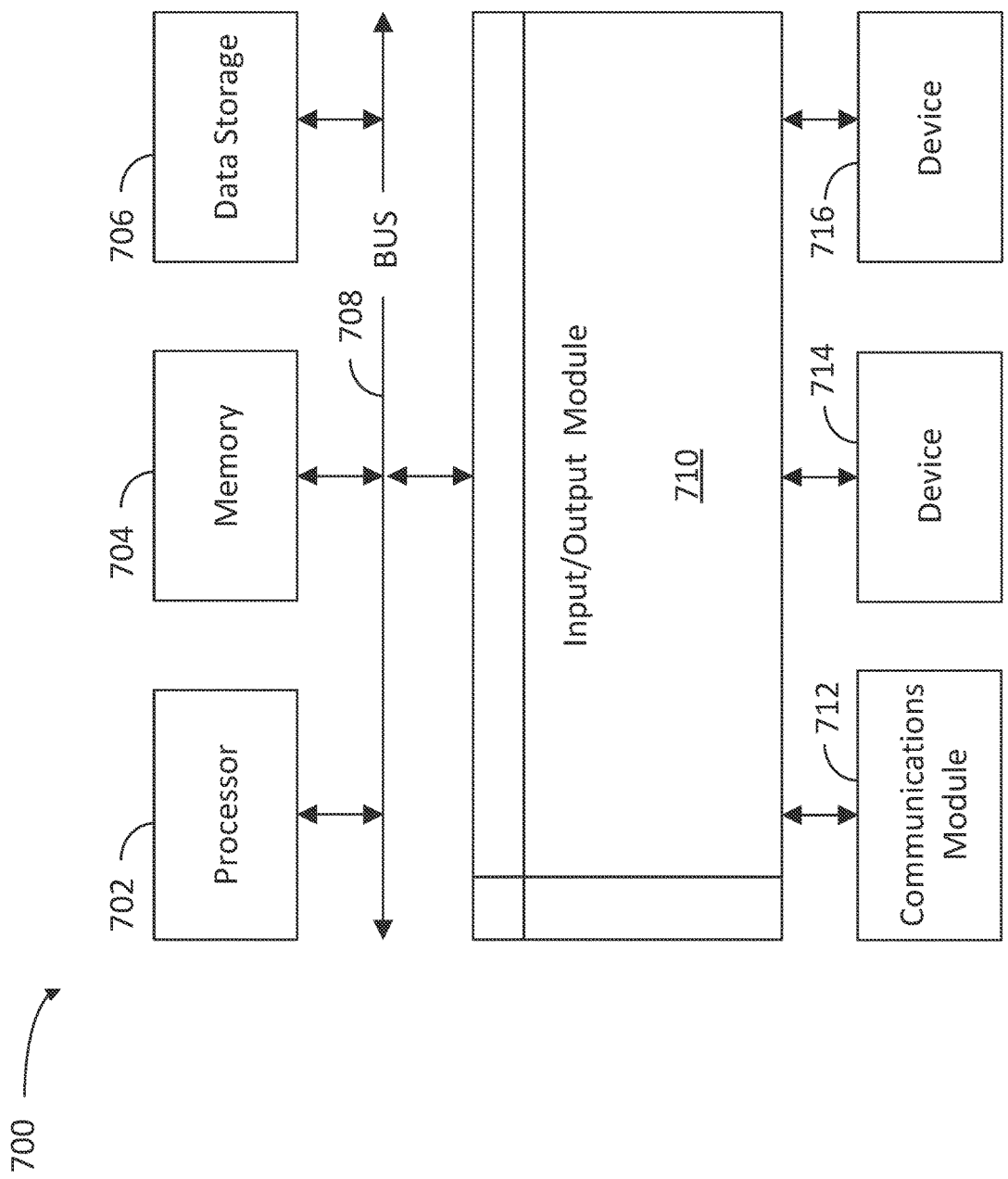
FIG. 7 is a block diagram of a computer system configured to execute at least some of the methods and devices disclosed herein, according to some embodiments.

FIG. 7 is a block diagram illustrating an exemplary computer system 700 with which the client device 110 and server 130 of FIG. 1, and the method of FIG. 6 can be implemented. In certain aspects, the computer system 700 may be implemented using hardware or a combination of software and hardware, either in a dedicated server, or integrated into another entity, or distributed across multiple entities.

Computer system 700 (e.g., client device 110 and server 130) includes a bus 708 or other communication mechanism for communicating information, and a processor 702 (e.g., processor 112) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 120), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, e.g., one or more modules of computer program instructions encoded on a computer-readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and intercoupled by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled with bus 708 for storing information and instructions. Computer system 700 may be coupled via input/output module 710 to various devices. Input/output module 710 can be any input/output module. Exemplary input/output modules 710 include data ports such as USB ports. The input/output module 710 is configured to connect to a communications module 712. Exemplary communications modules 712 (e.g., communications module 118) include networking interface cards, such as Ethernet cards and modems. In certain aspects, input/output module 710 is configured to connect to a plurality of devices, such as an input device 714 and/or an output device 716. Exemplary input devices 714 include a keyboard and a pointing device, e.g., a mouse or a trackball, by which a consumer can provide input to the computer system 700. Other kinds of input devices 714 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 716 include display devices, such as an LCD (liquid crystal display) monitor, for displaying information to the consumer.

According to one aspect of the present disclosure, the client device 110 and server 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

The subject technology is illustrated, for example, according to various aspects described below. Various examples of aspects of the subject technology are described as numbered clauses (claim 1, 2, etc.) for convenience. These are provided as examples, and do not limit the subject technology.

In one aspect, a method may be an operation, an instruction, or a function and vice versa. In one aspect, a clause may be amended to include some or all of the words (e.g., instructions, operations, functions, or components) recited in other one or more clauses, one or more words, one or more sentences, one or more phrases, one or more paragraphs, and/or one or more clauses.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
   identifying an eye gesture of a user of a headset, based on an eye-tracking signal;
   assessing a user intention for a selection in a user interface in the headset based on the eye gesture;
   activating an aspect of a display in the user interface based on the user intention;
   identifying, in the user interface in the headset, an object of the user intention; and
   displaying, on at least one eyepiece of the headset, a virtual assistant to indicate to the user an attribute of the object of the user intention that is relevant to the user.

2. The computer-implemented method of claim 1, further comprising:
   displaying, on the at least one eyepiece of the headset, an application interface for the user of the headset,
   wherein identifying the eye gesture of the user further comprises highlighting an icon in the application interface; and
   wherein activating the aspect of the display in the user interface further comprises activating an application corresponding to the selection based on the user intention and activating the icon in the application interface.

3. The computer-implemented method of claim 1, further comprising receiving a signal from a second wearable device on a user wrist, and identifying a hand gesture of the user based on the signal from the second wearable device, wherein assessing the user intention further comprises reproducing the hand gesture on an application interface displayed on an eyepiece of the headset.

4. The computer-implemented method of claim 1, further comprising receiving a signal from a second wearable device on a user wrist, the signal indicative of one of a scrolling, pinching, panning, or flipping gesture from the user, and wherein activating the aspect of the display in the user interface based on the user intention comprises scrolling, pinching, or flipping a graphic element of an application displayed on the at least one eyepiece in the headset.

5. The computer-implemented method of claim 1, wherein identifying the object of the user intention comprises identifying a content of a text being read by the user with the headset.

6. The computer-implemented method of claim 1, further comprising activating the virtual assistant when the eye gesture includes a gaze direction towards the virtual assistant.

7. The computer-implemented method of claim 1, further comprising activating the virtual assistant on the display of the headset upon receipt of a voice command from the user.

8. The computer-implemented method of claim 1, wherein the user interface includes a telephone application displayed in the user interface, further comprising displaying a pickup icon and a hang up icon on at least one eyepiece of the headset when the telephone application receives a call.

9. The computer-implemented method of claim 1, further comprising highlighting one of a pickup icon or a hang up icon for a telephone application on a headset display, based on the eye gesture.

10. The computer-implemented method of claim 1, further comprising assessing the user intention to pick up a call when the user maintains a gaze on a pickup icon on the display of the headset for a time longer than a pre-selected threshold.

11. A device, comprising:
at least one of a left eyepiece or a right eyepiece mounted on a frame;
an eye-tracking device configured to identify an eye gesture of a user;
a camera configured to collect an image of a field of view of the user; and
a processor configured to receive a signal from the eye-tracking device, the signal indicative of a user intention for a selection in a user interface, and to activate an aspect of a display in the user interface based on the user intention, the processors further configured to:
identify, in the image of the field of view of the user, an object of the user intention; and
cause to display, on at least one eyepiece, a virtual assistant to indicate to the user an attribute of the object of the user intention that is relevant to the user.

12. The device of claim 11, further comprising at least one display in the left eyepiece or the right eyepiece, the display configured to display the virtual assistant for the user, responsive to the user intention with the user interface.

13. The device of claim 11, further comprising the display in at least one of the left eyepiece or the right eyepiece, the display configured to provide an application interface for the user.

14. The device of claim 11, wherein the eye-tracking device comprises the camera configured to collect the image including at least one user's eye, wherein the processor is further configured to determine a gaze direction of the user and the user intention, based on the gaze direction.

15. The device of claim 11, wherein the eye-tracking device comprises an ultrasound emitter configured to map a portion of a face of the user that includes at least one user's eye.

16. The device of claim 11, wherein the eye-tracking device comprises an infrared light emitter configured to map a portion of a face of the user that includes at least one user's eye.

17. The device of claim 11, further comprising a memory storing instructions which, when executed by the processor, cause the device to perform an application algorithm that drives the user interface.

18. The device of claim 11, wherein the processor is further configured to receive a second signal from a wristband device when the user interface is active, the second signal indicative of the user intention with the user interface.

19. The device of claim 11, wherein the processor is further configured to receive a second signal from a wristband device, the second signal indicative of a hand gesture of the user to interact with the user interface.

20. The device of claim 11, wherein the processor is further configured to receive a second signal from a wearable device, the second signal indicative of the user intention with the user interface when the user interface is active.

* * * * *